Dec. 5, 1939.   A. W. BAIRD ET AL   2,182,575
ELECTRIC WELDING APPARATUS
Filed Aug. 7, 1937   6 Sheets-Sheet 1

INVENTORS
ALBERT W. BAIRD
FREDERICK G. OUTCALT
BY F.L. Greenewald
ATTORNEY

Dec. 5, 1939.　　A. W. BAIRD ET AL　　2,182,575
ELECTRIC WELDING APPARATUS
Filed Aug. 7, 1937　　6 Sheets-Sheet 3
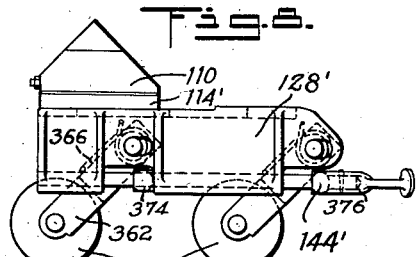
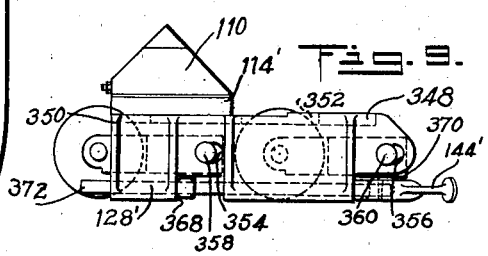
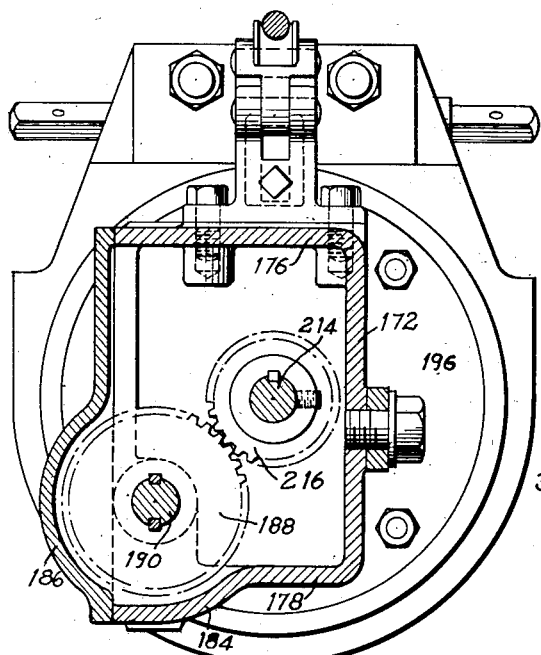
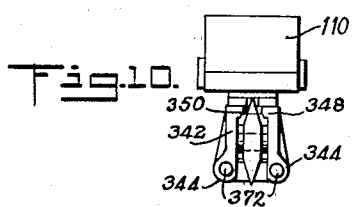
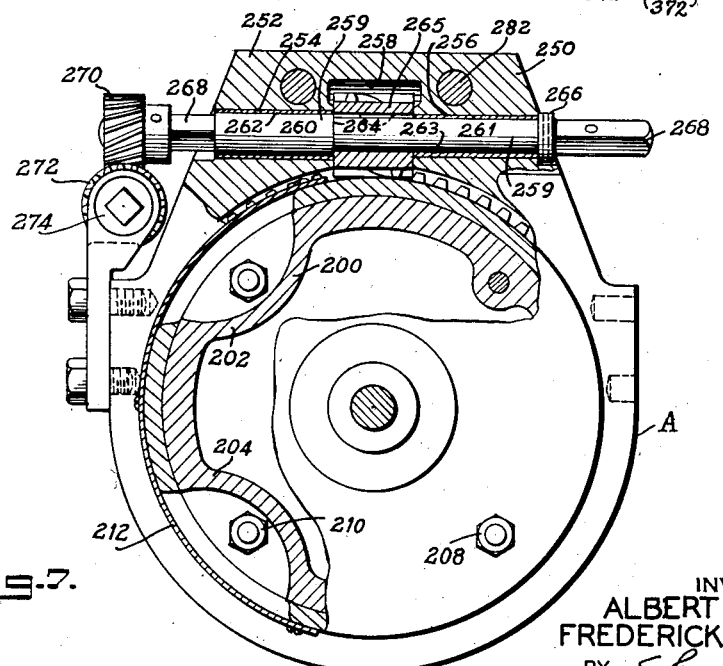
INVENTORS
ALBERT W. BAIRD
FREDERICK G. OUTCALT
BY *Greenewald*
ATTORNEY

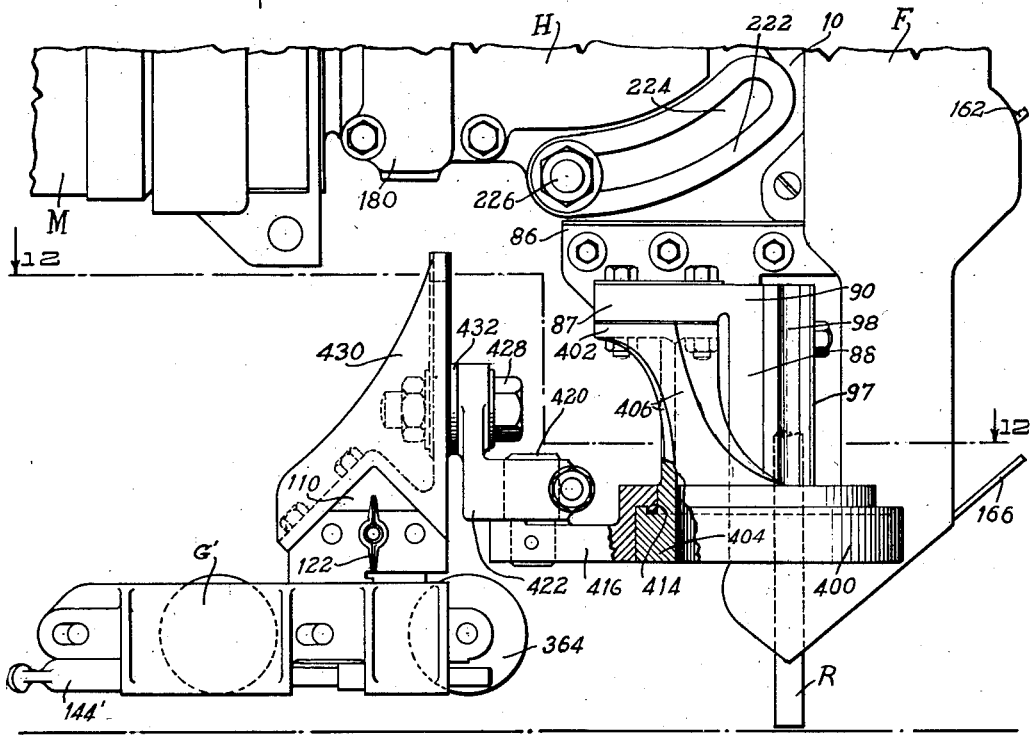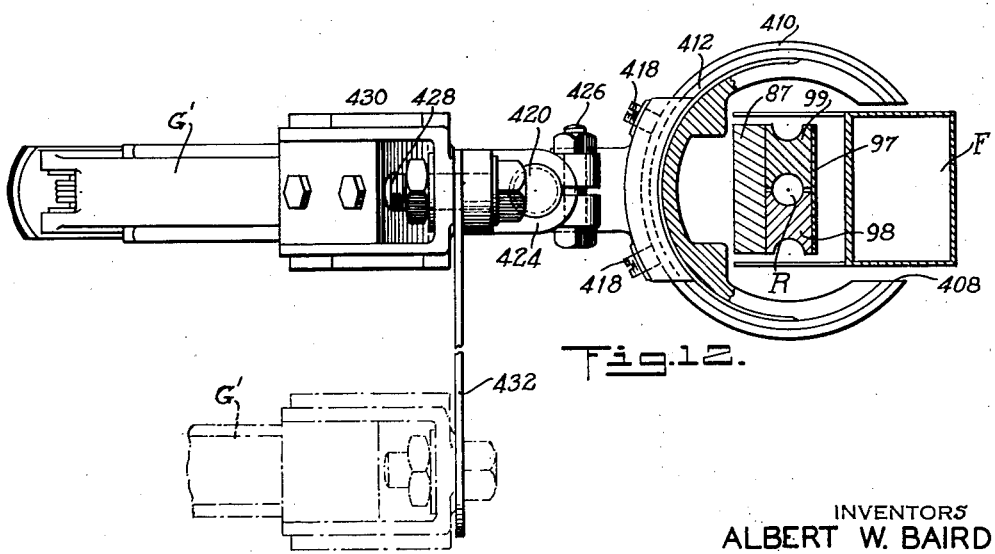

Dec. 5, 1939.     A. W. BAIRD ET AL     2,182,575
ELECTRIC WELDING APPARATUS
Filed Aug. 7, 1937     6 Sheets-Sheet 5
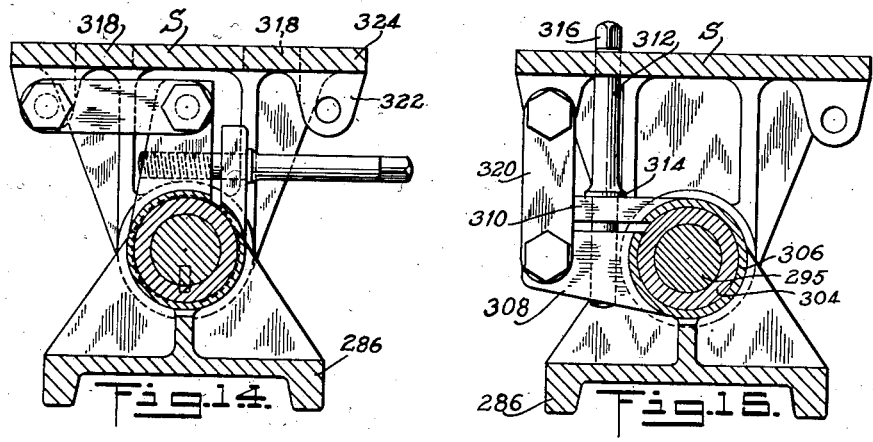
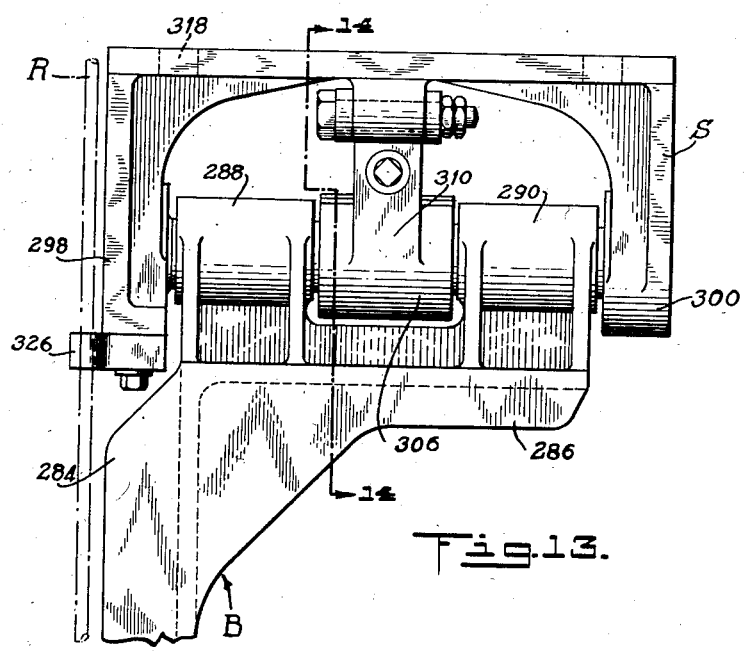
INVENTORS
ALBERT W. BAIRD
FREDERICK G. OUTCALT
BY
ATTORNEY

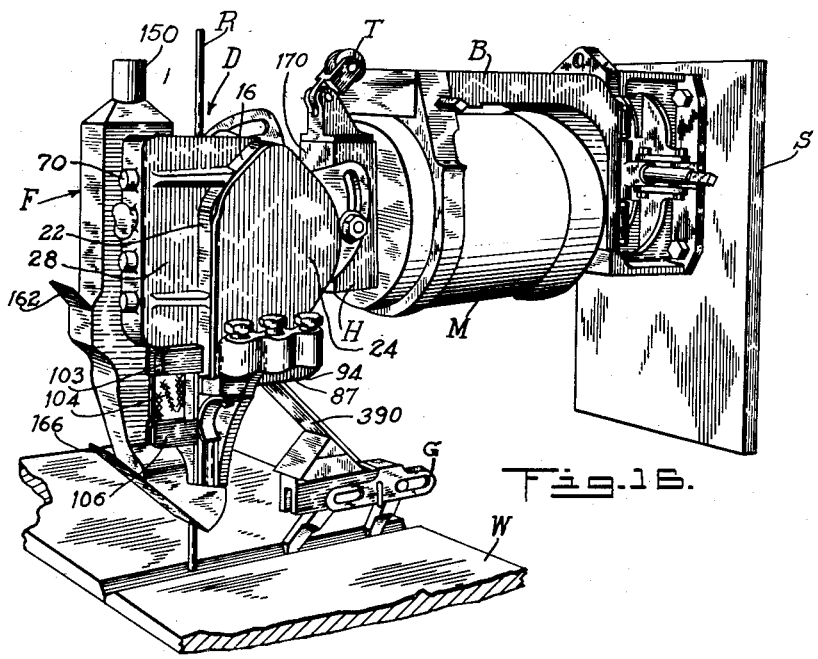
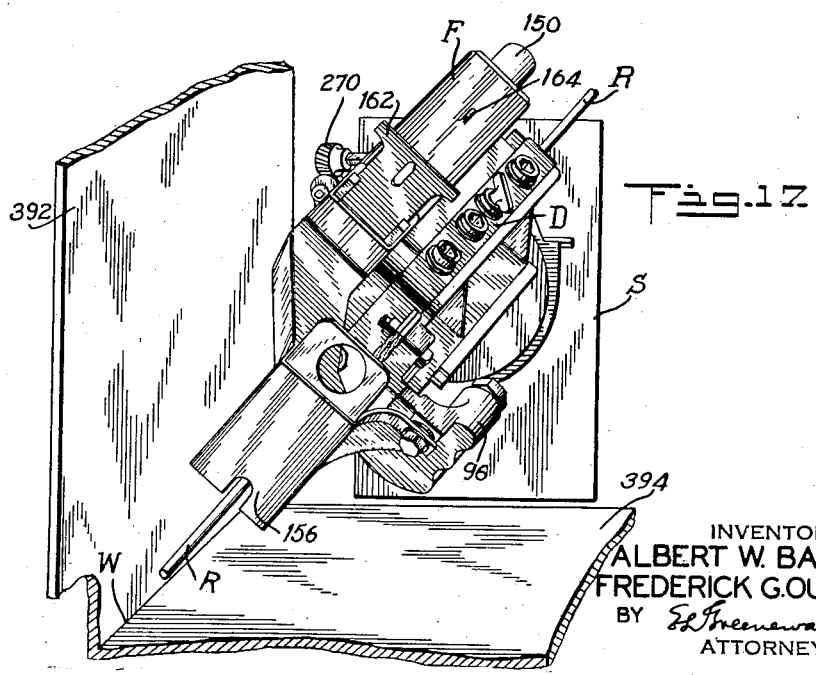

Patented Dec. 5, 1939

2,182,575

UNITED STATES PATENT OFFICE 2,182,575

ELECTRIC WELDING APPARATUS

Albert William Baird, Elizabeth, N. J., and Frederick Gurnee Outcalt, New Rochelle, N. Y., assignors to The Linde Air Products Company, a corporation of Ohio Application August 7, 1937, Serial No. 157,868

20 Claims. (Cl. 219—8)

This invention pertains to electric welding apparatus and more particularly to an improved automatic welding head of a compact and flexible design readily adaptable to feed a welding electrode to the work at any desired angle.

A welding apparatus embodying this invention is particularly adaptable to the welding process described and claimed in United States Patent No. 2,043,960, issued on June 9, 1936, to L. T. Jones et al. In the process disclosed and claimed in this patent, welding is accomplished by passing a high amperage electric current from an electrode to the work to be welded through an inorganic, highly resistant welding material substantially free from substances evolving deleterious amounts of gases; which material is heaped on the line to be welded in such quantity as to completely submerge the welding operation under a blanket of the welding material.

In fabricating various types of electrically welded joints, such as corner welds, fillet welds and the various forms of welded joints for pipe turns, the welding rod must be fed to the work at an angle to the vertical plane through the line to be welded.

When welding is done by automatic welding machines, which are usually of such a weight that they must be suspended from a support, the support is often not of such a character or not suitably located to readily permit the welding rod to be fed to the work at the desired angle. To obtain optimum results in welding, it is further often desirable to feed the welding rod to the work in a plane through the welding line but at a certain definite angle to the welding line in that plane. A welding head of such a flexible design that it may be suspended from any available support and still feed the welding rod to the work at any desired angle, and incorporating means to retain the welding head in alignment with the welding line, has long been needed. In the above described welding process, it is also desirable to provide some means for conveying the granular welding material to the welding line and insuring the provision of a proper amount thereof adjacent the welding point.

Various types of complicated adjustable supports have been devised to permit flexibility in machine welding operations. As these remedies have been directed to providing flexibility in the support rather than in the machine itself, they have generally been unsatisfactory and, furthermore, have been unduly cumbersome and complicated.

It is, accordingly, among the objects of this invention to provide a welding head adapted to automatically feed a continuous welding rod to the work; to provide a support, guiding and adjustment means to maintain the welding rod in the proper position relative to the work; to provide means for automatically insuring the provision of the proper amount of welding material adjacent the welding rod; to provide a welding rod feeding mechanism which is substantially universally adjustable with respect to the support for the welding head; to provide an automatic welding head, the component parts of which are relatively adjustable; and, in general, to provide an improved compact and flexible automatic welding head easily adjustable for feeding the welding rod to the work at any desired angle and which may be used with any available fixed or movable supporting means.

These and other objects of the invention will become apparent from the following description when read in connection with the accompanying drawings, in which:

Fig. 6 is a section on the line 6—6 of Fig. 1 looking in the direction of the arrows;

Fig. 7 is a view, partly in section, taken on the line 7—7 of Fig. 2 looking in the direction of the arrows;

Fig. 8 is a side view of a modified form of guiding device for use with the improved welding head of the invention;

Fig. 9 is a view similar to Fig. 8 showing the guiding device in the inoperative position;

Fig. 10 is a view looking toward the left end of the guiding device shown in Fig. 9;

Fig. 11 is a side view, partly in section, of another modified form of guiding device;

Fig. 12 is a view, partly in section, taken on the line 12—12 of Fig. 11 looking in the direction of the arrows;

Fig. 13 is a view of the hinge support and hinge clamp for the improved welding head of the invention;

Fig. 14 is a section on the line 14—14 of Fig. 13 looking in the direction of the arrows;

Fig. 15 is a view similar to Fig. 14 but showing the locking mechanism mounted for operation from a different position;

Fig. 16 is a perspective view of the improved welding head of the invention as mounted for swinging movement in a horizontal plane with the feeding mechanism mounted to feed the welding rod vertically to the work; and Fig. 17 is another perspective view of the improved welding head of the invention as mounted for making a corner weld between two plates mounted at an angle to each other.

Figure 1:
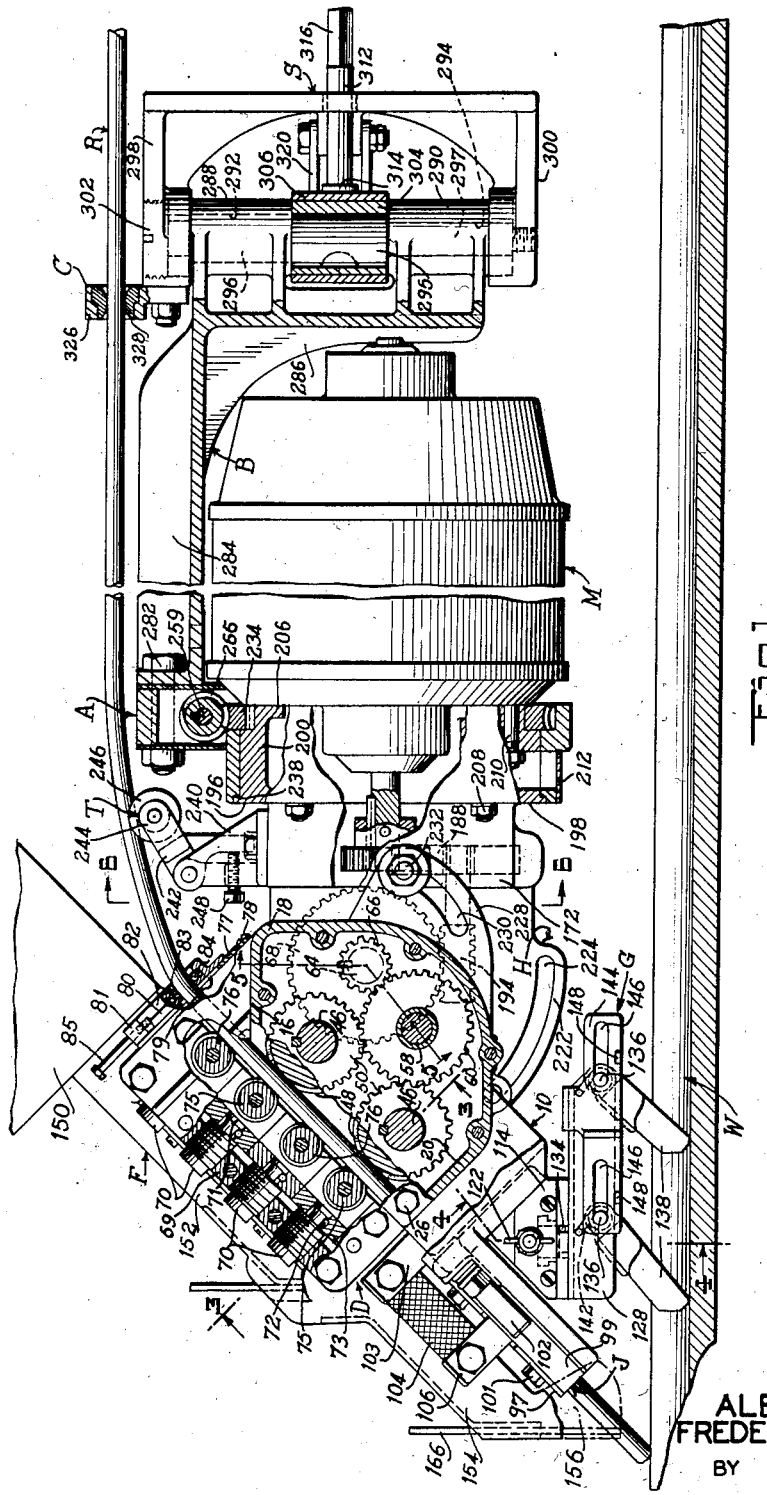
Fig. 1 is a side view, partly in section, of an electric welding head embodying this invention.
Figure 2:
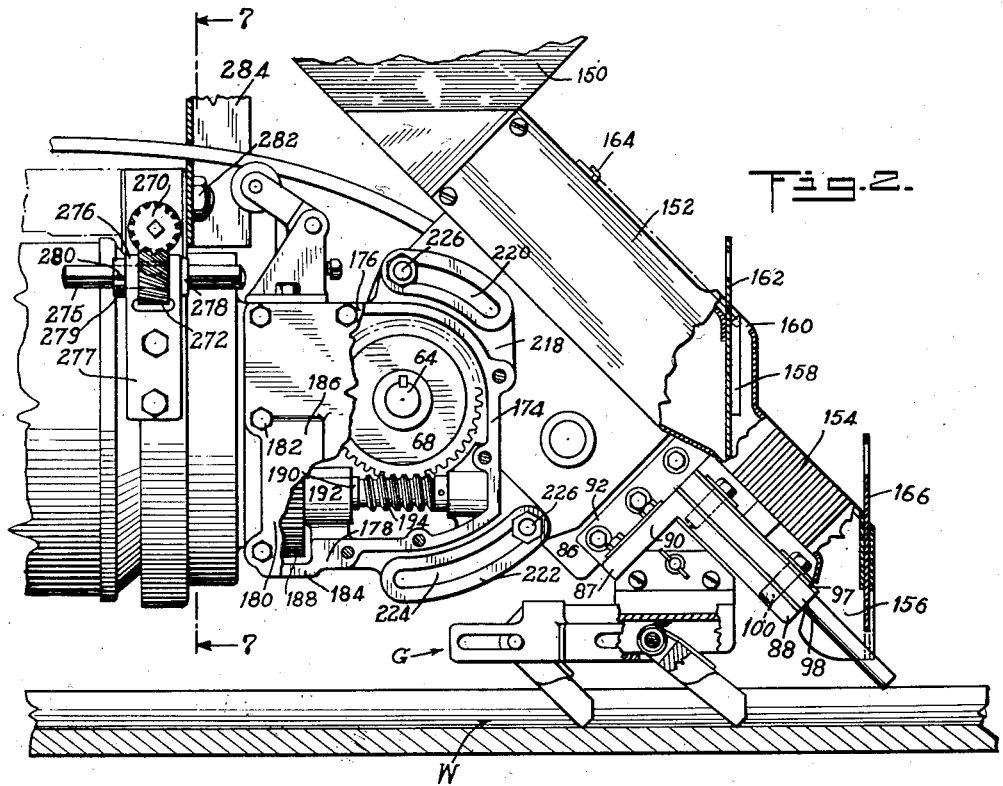
Fig. 2 is a view of the opposite side of the welding head shown in Fig. 1.
Figure 3:
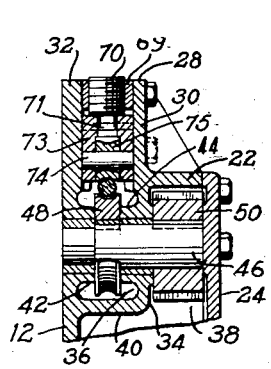
Fig. 3 is a section on the line 3—3 of Fig. 1 looking in the direction of the arrows.

As best shown in Figs. 1 and 2, the automatic electric welding head embodying this invention comprises a welding material feeding mechanism F secured to a welding rod straightening and driving mechanism D to which is also secured a guiding device G which may engage a portion of the work, such as a welding groove W or some other suitable guiding surface. The straightening and driving mechanism D is adjustably and operably secured to a gear housing H, to which is also secured a driving motor M adjustably mounted in a support A. Support A is bolted or otherwise detachably secured to a bracket B which is pivotally and swingably mounted in a main support S, which latter support may be either fixed or movable with respect to the welding seam or work W. Welding rod R is fed from a coil of welding rod or other suitable source of supply through a suitable guide C, over tensioning roller T and through the straightening and driving mechanism D, from whence it passes between electric current carrying contact jaw plates J to the welding seam or work.

The rod straightening and driving mechanism D includes an adjustable gear housing 10 provided with a flat wall 12 having a smooth exterior face for bearing engagement with a similar face formed on the wall 14 of the gear housing H, which is in engagement with the gear housing 10. Walls 16, 18, 20, and 22, formed integral with wall 12, extend at right angles thereto, and a cover plate 24 for the adjustable gear housing 10 is secured thereto by suitable cap screws 26 threaded in tapped lugs formed on these walls. Walls 16 and 22 are approximately half the width of walls 18 and 20, and terminate in a wall 28 extending parallel to and spaced from the wall 12. Wall 28 includes a portion 30 extending outwardly from the wall 22 and paralleling an extension 32 of the wall 12. Portion 30 and extension 32 form an elongated bearing recess for a purpose described hereinafter. A portion 34 of wall 28 extending inwardly from the wall 22 divides the housing 10 into two compartments 36 and 38, and a wall 40 joins portion 34 to wall 12. Opposing bosses 42 and 44, formed respectively on the wall 12 and the portion 34, extend toward each other and cooperate to form a bearing for a feed roller shaft 46. Disposed in the space between the bosses 42 and 44, and keyed to the shaft 46, is a welding rod feed roller 48, and also keyed to the shaft 46 and disposed between portion 34 of wall 28 and cover plate 24 is a spur gear 50. As shown in Fig. 1, there are two feed rollers 48 and two spur gears 50, each set being mounted on one of the feed roller shafts 46.

A bearing block 52 provided with spaced bores 54 and 56 is formed on the wall 12 below the wall 40. Mounted in the bore 54 is a dowel pin 58 supporting an idler gear 60, which, as can be seen from Fig. 1, is enmeshed with each of the spur gears 50. Rotatably mounted in the bore 56 is a tubular bearing member 62 formed integral with the wall 14 of the gear housing H, in which bearing member is mounted a worm gear shaft 64, on one end of which is formed a spur gear 66, mounted in the gear housing 10 and in engagement with the idler gear 60. A worm gear 68, mounted in the gear housing H, is keyed to the opposite end of the shaft 64.

Secured between the upper ends of the portion 30 and extension 32 is a straightening roller block 69 provided with four aligned threaded apertures in each of which is mounted an adjusting screw 70. Each screw 70 is provided with a head portion 71 rotatably secured by means of a pin 72 in a recess formed in an adjustable bearing block 73, which slidably engages the portion 30 and extension 32 below the straightening roller block 69. Rotatably mounted in each block 73 on a shaft 74 is either a pressure roller 75, having a plane contact face, or a straightening roller 76, having a grooved contact face. Reading from left to right in Fig. 1, the first and third rollers are pressure rollers and the second and fourth rollers are straightening rollers. Each pressure roller 75 is mounted opposite a feed roller 48.

A cover plate 77 is fastened by screws 78 to wall portion 30 and wall extension 32 and closes the space therebetween. Cover plate 77 is formed with an elongated opening 79, through which the welding rod R may pass, a pair of spaced guides 80 and a block 81 adjacent one end of the guides. A plate 82 provided at one end with an aperture 83 in which is mounted a washer 84, of felt or other suitable material, through which the rod R passes is slidably secured in the guides 80. A guiding bolt 85 is threaded into the opposite end of the plate 82 and extends through an aperture in the block 81.

A rib 86 extends downwardly from wall 20, and bolted or otherwise secured to this rib, is a generally angular bus bar 87 provided with a stem portion 88, a head portion 90, a rib 92 secured to the rib 86, and a portion 94 parallel to the rib 92 and formed with cable terminals 96. Contact jaw plates J are secured in bearing engagement between one face of the stem portion 88 and a bus bar plate 97, and consist of a stationary jaw plate 98 and a movable jaw plate 99. Each jaw plate is provided with a groove in each of its longitudinal edge portions. Plate 98 is rigidly mounted on stem 88 by bolts 100, whereas plate 99 is movably mounted on the stem by bolts 101 extending through slots in the plate 99. A flat spring 102, bolted to the bus bar 87, presses the movable plate 99 into engagement with the rod R, thereby forcing the rod R into engagement with the stationary plate 98. A flexible braid 104 extends between a yoke 103 formed on the bus bar 87 and a yoke 106 formed on the movable jaw plate 99 for independently conducting current to the movable plate and thence to the rod R.

Mounted between the opposite face of the stem portion 88 and the head portion 90 of the bus bar 87 is the guiding device G. Guiding device G includes a triangular guide block 110 formed with either a T-shaped slot or a dovetail groove in its lower portion in which slot or groove is received a correspondingly shaped head portion 112 of a guide finger slide 114. The upper end of head portion 112 is provided with threaded recesses 116 receiving an adjusting screw 118, the ends of which screw threadedly engage a pair of plates 120 secured to the block 110 and are provided with wing-nuts 122. A vertically extending bore 124 in head portion 112 receives a cylindrical bearing portion 126 formed on a guide finger bracket 128. The cylindrical bearing portion 126 comprises a head 130 and a neck 132, and a pin 134 is placed between the neck 132 and the bore 124 below the head 130 to secure the parts 114 and 128 in pivotal relation. The bracket 128 is U-shaped in cross-section, and a pair of pins 136 extend between the arms of the U on each of which is pivoted a guide finger 138 provided with a pair of spaced apertured ears 140 engaging one of the pins 136. Springs 142, secured to the guide finger bracket 128, each surrounds a pin 136 and bears against a guide finger 138 to force the latter to a downward position. A U-shaped guide finger retaining slide 144 slidably bears on the bracket 128 and the arms of this slide are formed with slots 146 each engaging a pin 136. Stops 148 extend between the lower ends of the arms of the U and, when the slide is moved to the left from the position shown in Fig. 1, these stops will engage the guide fingers 138, move the same to a retracted position and retain them in that position.

The feeding device F for the granular welding material, which is secured to the welding rod driving mechanism D, includes an upper portion 150, which may be a hopper as shown in Figs. 1 and 2 or a fitting to receive a welding material conduit as shown in Figs. 16 and 17. The feeding device proper comprises a rectangular tubular portion 152 terminating in a reduced funnel portion 154, the outer end 156 of which is turned at an angle of 45° to the main axis of the feeding device. Slidably disposed between guides 158 at the junction of the portions 152 and 154 and extending through an opening 160 is a shut-off gate 162 which may be withdrawn from the guides 158 and secured to a hook 164 mounted on the portion 152. A control gate 166 is slidably mounted in the outer end 156 of the funnel portion 154 and both this control gate and the outer end 156 of funnel portion 154 are provided with cut-away portions to permit passage of the welding rod R therethrough.

The side wall 14 of the gear housing H terminates in a wall 170 at a right angle thereto, which in turn is formed integral with a wall 172 parallel to the wall 14. End wall 174, top wall 176, and bottom wall 178 cooperate with walls 14, 170, and 172 to form a box-like structure, the open side of which is closed by a cover plate 180 fastened by cap screws 182 to the main portion of the housing H. Wall 178 and cover plate 180 are formed with offset portions 184 and 186, respectively, to accommodate a spur gear 188 mounted on a worm shaft 190 extending through a bearing 192 formed on the bottom wall 178. On the opposite end of shaft 190 is formed a worm 194 engaging the worm gear 68. Gear housing H terminates in an annular bearing 196 offset with respect to the main axis of the housing H, and to the opposite side of which bearing is secured the motor M. As best shown in Figs. 1 and 7, the annular bearing 196 comprises a flat wall 198 integral with a generally circumferential wall 200 provided with radially inset portions 202 and 204 at certain portions of its periphery which are disposed in back of the main portion of the gear housing H. An inwardly extending annular rib 206 is formed on the opposite edge of wall 200. Two series of bolts 208 and 210 secure the motor M to the gear housing H, the bolts 208 extending through the bearing 196 in the portion which is offset from the main part of the gear housing H, while the bolts 210 extend through the annular bearing 196 into the recesses formed by the radially inset portions 202 and 204 of the wall 200. These inset portions are disposed in back of the housing H to allow access to the bolts 210 for disassembling the machine, and the recesses formed by the inset portions 202 and 204 are normally closed by a cover plate 212.

Motor armature shaft 214 extends centrally through the annular bearing 196, and keyed to the end of this shaft is a spur gear 216 which meshes with the spur gear 188 keyed to the worm shaft 190.

Extending outwardly from the wall 176 is a rib 218 provided with an arcuate slot 220, and extending outwardly from the wall 178 is a rib 222 provided with an arcuate slot 224. Arcuate slots 220 and 224 are formed about the shaft 64 as a center, and each of these slots is slidably engaged by a stud 226 secured to the adjustable gear housing 10. A rib 228 extends outwardly from the curved wall 18 of the adjustable gear housing 10 and is provided with an arcuate slot 230, also formed about the shaft 64 as a center, and slidably engaging this arcuate slot is a stud 232 threaded into the housing H.

The annular bearing 196 is formed with a circumferential cut-away portion adjacent the inwardly extending annular rib 206, and in this cut-away portion is mounted a worm gear 234 keyed to the bearing 196. Adjacent the wall 200 of the annular bearing 196 is an integral, outwardly extending circumferential rib 236.

The rod tensioning device T, which is mounted on the housing H, includes a bracket 240 in which is pivotally mounted a bell crank yoke 242 having a forked end 244 in which is mounted a grooved tension roller 246. The opposite arm of the yoke may be engaged by a set screw 248 to adjust the pressure with which the roller 246 engages the welding rod R.

Annular bearing 196 is mounted in the support A, which comprises an annular member 250 slidably engaging the wall 200, the worm gear 234 and the rib 236. An ear 252 is formed on the upper side of member 250 and is provided with end bores 254 and 256 and a central bore 258. As best shown in Fig. 7, bore 256 is smaller than bore 254 and central bore 258 is much larger than either of the two end bores. A worm shaft 259 having portions 260 and 261 of the same respective diameters as the bushings 262 and 263 fitted respectively in the bores 254 and 256, extends through these bores, and a shoulder 264 thereon engages a worm 265 keyed to the shaft 259 and mounted in the bore 258. Worm 265 prevents movement of the shaft to the right as viewed in Fig. 7 and collar 266 mounted on the smaller end of the shaft 259 prevents movement of the shaft in a direction to the left as viewed in Fig. 7. Each end of the shaft 259 is squared as at 268 to receive a wrench or other suitable tool for turning the worm 265. If desired, a spiral gear 270 may be mounted on one end of the shaft 259 and may engage a second spiral gear 272 mounted on a shaft 274, which is provided with squared ends 275, to receive a wrench or other suitable tool, and is mounted between the apertured ears 276 of a bracket 277 secured to the annular member 250. Shaft 274 is secured in the bracket 277 by means of an integral collar 278 and a removable collar 279 secured to shaft 274 by pin 280.

An arm 284, forming part of the bracket B, is bolted to the ear 252 of the annular member 250 by bolts 282. This arm may be so secured to the annular member 250 that it extends in a horizontal direction, as shown in Fig. 1, or in a vertical direction, as shown in Fig. 2. Bracket B is formed with a second arm 286, extending at a right angle to the arm 284 and formed with spaced bearings 288 and 290; bearing 288 being provided with a bore of relatively large diameter, 292, and bearing 290 being provided with a bore of relatively small diameter, 294. A shaft 295 having portions 296 and 297, of diameters corresponding to the respective diameters of the bores 292 and 294 of the bearings 288 and 290, extends through these bearings and is rotatably secured therein by means of anti-friction bearings in the arms 298 and 300 of the U-shaped main support S. An adjusting screw 302 is used to adjust the bearing pressure on the shaft 295, which shaft is keyed to the arm 286. A clamping sleeve 304 surrounds the central portion of the shaft 295 and is keyed thereto, and surrounding this clamping sleeve, is a split clamp 306 provided with arms 308 and 310. Arm 308 is threaded to receive a screw 312 provided with a collar 314 bearing against the arm 310 and a squared end 316 to receive a suitable wrench or other tool. As best shown in Figs. 13 to 15, support S is provided with a series of apertures 318, and a pair of links 320 are secured to the arm 308 and any one of several lugs 322 formed on the support S. As shown in Figs. 14 and 15, these means permit the clamp 306 to be turned to any one of several positions so that the same may be operated with the screw 312 extending through one of the apertures 318 or extending parallel to the main wall 324 of the support S in either direction from the shaft 295.

The guide C is secured to the arm 298 of the main support S and comprises a plate 326 in which is fitted an apertured guide bushing 328 through which the welding rod R may pass.

Figure 4:
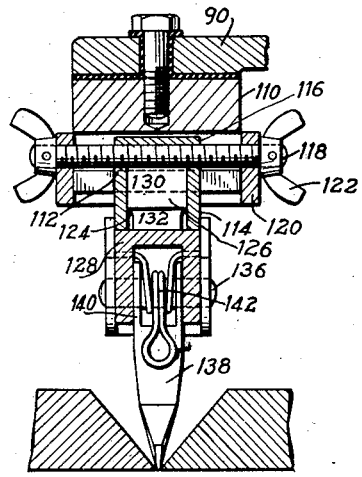
Fig. 4 is a section on the line 4—4 of Fig. 1 looking in the direction of the arrows.
Figure 5:
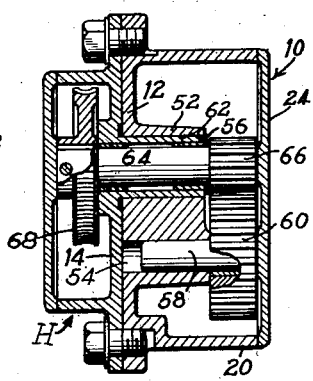
Fig. 5 is a section on the line 5—5 of Fig. 1 looking in the direction of the arrows.

A preferred form of guiding device G', which may be substituted for the guiding device G shown in Figs. 1, 2, and 4, is shown in Figs. 8, 9, and 10. This modified guiding device includes a slide 114' and a guide roller bracket 128'. Slide 114' is secured to guide block 110 for lateral adjustment thereon and bracket 128' is pivotally secured to slide 114'. The connections between these elements are similar to those previously described in connection with guiding device G. Bracket 128' includes spaced side walls 342 each formed with a thickened lower edge 344 provided with a bore. A top wall portion 348 formed with an open ended slot 350 and an aperture 352 connects side walls 342. Each side wall 342 is slotted as at 354 and 356, and through each of these slots extends a pin 358 or 360, on each of which is pivotally mounted an arm 362 having a forked end receiving a guide roller 364. A spring 366 acts to urge each arm 362 in a downward direction. Each of the walls 342 is also formed with cut-out portions 368 and 370. Guide finger retaining slide 144' includes two rods 372, each engaging in one of the above mentioned bores, a block 374 fixedly mounted on the rods 372 and disposed in the cut-away portions 368 and a combined handle and block portion 376 also fixedly mounted on the rods 372 and disposed in the cut-away portions 370.

When the slide 144' is moved to the right as shown in Fig. 8, the guide rollers 364 will be urged to their downward or guiding position by the springs 366 engaging the arms 362. When the slide 144' is moved to the left to the position shown in Fig. 9, the guide rollers 364 are moved to the upward position, wherein, as viewed in Fig. 9, the left hand roller extends through slot 350 and the light hand roller extends through the aperture 352, and the rollers 364 are retained in this upward position. When the guide rollers are in their guiding position, as shown in Fig. 8, and they encounter an obstruction, the arms 362 will tend to pivot about the block 374 or the handle and block portion 376, respectively, and the pins 358 or 360 will move to the right in the slots 354 or 356 thus allowing the guide roller to move over the obstruction. Suitable means may be provided to retain the guide roller bracket 128' against rotation and in a position parallel to the long side of the block 110, when so desired.

Another guiding arrangement for use with the welding head of the invention and permitting great flexibility in operation, is shown in Figs. 11 and 12. In this arrangement, an adjusting ring 400, including a top portion 402 and a bottom portion 404 connected by ribs 406, is bolted to the head 90 of the bus bar 87. The lower portion 404, which is circular in form, is cut away, as at 408, to accommodate the stem 88 of the bus bar 87, the jaw plates 98 and 99, the rod R, and the feeding device F. The lower portion is flanged as at 410 and in this flange is cut a circular groove 412 which receives a lip 414 formed on a support 416, the inner end of which is shaped to fit the ring 400. The support 416 may slide on the ring 400 about the rod R as an axis and may be held in any adjusted position on the ring by set screws 418. A stud 420 is secured in the opposite end of support 416 and has mounted thereon an L-shaped bracket 422 formed at one end with a split clamp 424 operated by a bolt 426 and at the opposite end with an aperture receiving a bolt 428. The guide block support 430 is secured to the clamp 422 by the bolt 428, and secured to this guide block support is the triangular block 110, forming part of the guiding device G or G'. The support 430 may be secured directly to the clamp 422 but is preferably secured thereto by a slotted adjusting bar 432 as shown in dotted lines in Fig. 12.

The above arrangement permits substantially universal adjustment of the guiding device G or G' with respect to the gear housing 10, as the guiding device is pivotal about the rod R, the stud 420 or the bolt 428. The device G or G' may be laterally and vertically adjusted with respect to the support 430 by means of the bar 432. In addition, as previously described, the guiding device itself is pivotal in a horizontal plane with respect to the block 110.

With the above described construction, a number of positions of the guiding device with respect to the welding head are possible. The welding head may be disposed at an angle to the work, as shown in Fig. 17, and the guiding device extend in a vertical plane to engage any suitable guiding surface. If the head is used to make a fillet weld, the guiding device may be turned and adjusted with respect to the head to engage a vertical surface, such as one of the plates to be welded. If the gear housing 10 is adjusted with respect to the gear housing H so that the rod R extends at an angle of 45° to the vertical, the guiding device G or G' may be disposed parallel to the horizontal plane by suitably twisting the bar 432.

As another instance, the guiding device may be adjusted with respect to the welding head so that it will follow a guiding surface parallel to, but suitably spaced from the line to be welded. Numerous other arrangements, obvious without further description, are easily possible with this guiding arrangement.

When a welding operation is to be performed by the above described automatic welding head, a welding rod R is first threaded through the guide bushing 328, over the roller 246, under the straightening rollers 76, between the pressure rollers 75 and the feed rollers 48, and between the jaw plates 98 and 99 to the welding seam. By means of the set screw 248, the tension roller 246 is first adjusted the necessary amount to bring the portion of the welding rod disposed to the left thereof into engagement with the first straightening roller 76. This first straightening roller is so adjusted that it will maintain the original curvature of the welding rod, and tension the rod sufficiently to keep the plane of curvature of the rod in the plane of the straightening and driving mechanism D. This prevents any "flopping" of the rod as it enters the straightening mechanism, and thereby assures that the second straightening roller 76, when properly adjusted, will cooperate with the two sets of pressure and driving rollers to remove the curvature from the welding rod. Pressure rollers 75 are adjusted to insure a positive gripping action between the feed rollers 48 and the welding rod R. Worm 265 is then turned by means of a wrench or other tool applied to one of the ends 268 of worm shaft 259, or to one of the ends 275 of the shaft 274, to place the welding head in the proper angular position with respect to the support S, and the welding rod straightening and driving mechanism D is adjusted with respect to the gear housing H to set the angle with which the welding rod R is fed to the work in the plane through the motor armature shaft.

If it is desired to hold the welding head in a fixed position with respect to the support S, the clamp 306 may be tightened to prevent any movement of the welding head with respect to the support. However, if it is desired to give the welding head some play with respect to the support S the clamp 306 is loosened and the guiding device G or G' is properly adjusted with respect to the welding line so that the guide fingers 138 or the guide rollers 364 will maintain the welding head in alignment with the work. The guiding means may contact either the welding seam or groove, or any other suitable guiding surface. Finally, the control gate 166 is adjusted to deliver the proper amount of welding material to the work. The shut-off gate 162 is then lifted and hooked over the hook 164 and the electric current is turned on, the current passing from the cable terminals 96 to the fixed jaw plate 98 and, through the medium of the flexible braid 104 to the movable jaw plate 99, from which plates it enters the welding rod R. A longitudinal groove is provided in each edge of each contact jaw plate J, as previously stated, so that these plates may be reversed in position on the bus bar 87 when the groove on one edge of a jaw plate has become worn to the extent where adequate contact with the welding rod is no longer obtained.

The opposite terminal of the electric current supply is connected to the welding seam or work W. The machine is then in position for operation, and either the machine may be moved relatively to the work, as when the support S is attached to a movable member, or the work may be moved relatively to the machine and the welding head held stationary.

When the bracket B is mounted vertically with respect to the support A, as shown in Fig. 2, the machine as a whole is adapted to swing in a plane perpendicular to the work in accordance with movement of the guiding device G or G', to follow irregularities in the welding line. The machine may likewise swing with respect to the work, but in a plane parallel thereto, when the bracket B is attached to the support S in a generally horizontal position, as best shown in Fig. 1. The freedom of this swinging action may be controlled by means of the screw 302 which adjusts the bearing pressure on the shaft 295 of the pivotal support for the welding head.

A suitable supply of granular welding material may be placed in the hopper 150 as shown in Figs. 1 and 2, or conduits may be connected to the fitting 150, as shown in Figs. 16 and 17, to supply the welding material from a central source. The guiding device G or G' may be adjusted laterally with respect to the mechanism D by means of the screw 118.

The gear train for the welding rod driving mechanism includes the motor shaft 214, the spur gear 216 keyed to the motor shaft 214, spur gear 188, worm 194, worm gear 68, worm gear shaft 64, spur gear 66, idler gear 60 and spur gears 50 keyed to shafts 46 on which are mounted the feed rollers 48. Two pivotal points are thus provided for the driving mechanism D, one being the armature shaft 214 and the other being the shaft 64, which pivotal axes, being disposed at right angles to each other, permit substantially universal adjustment of the mechanism D with respect to the support S.

Although in the above description of the operation of the machine, it was stated that the welding rod R was threaded through the guide bushing 328 and over the roller 246, if such procedure is not advisable or desirable, the rod R may be fed from a suitable supply directly to the mechanism D without passing through either the bushing 328 or over the roller 246. This is sometimes desirable when the support S and the bracket B are disposed in vertical position with respect to the machine, or when the mechanism D is arranged to feed the welding rod in a vertical direction with respect to the work.

Fig. 16 shows the welding head attached to the support S, with the mechanism D arranged to feed the rod R vertically to the work. In this instance, an adaptor strap 390 is provided to secure the guiding device G or G' to the bus bar 87 in proper relation to the welding groove. If desired, however, the guiding arrangement shown in Figs. 11 and 12 may be used in this instance.

In Fig. 17, the welding head is shown as turned to an angle of approximately 45° with respect to the support S in order to permit the welding head to make a corner weld between the plates 392 and 394. In this instance, the mechanism D is turned at an angle of about 45° with respect to the gear housing H, and again the guiding arrangement of Figs. 11 and 12 may be used.

Suitable graduations may be provided alongside the slots 220, 224, and 230 to permit accurate adjustment of the mechanism D with respect to the housing H. These graduations may also be provided on the bearing 196 and the member 250 to insure accurate positioning of the mechanism D with respect to the vertical plane through the motor armature shaft 214.

As is customary in the art, suitable gaskets and oil seals have been provided where necessary throughout the machine and suitable insulation has been applied where needed to prevent short circuits between points of opposite polarity on the welding head, such as between the guiding device G or G' and the mechanism D, and between parts in conductive contact with the welding rod R and the remaining parts of the machine. Oil filler openings are provided for the adjustable gear housing 10 and the gear housing H and oil inspection openings are also provided for these gear housings. Strengthening ribs for various parts of the machine have also been provided where necessary. It has not been deemed essential to describe these well-known features of construction as they do not constitute an essential feature of the invention.

All adjusting means for the machine are designed so that they may be operated from any one of several positions to insure ready access thereto when setting the machine preparatory to making a weld. For instance the bracket 277 may be mounted on the opposite side of the support S from that shown if such procedure is desirable, or may be eliminated entirely and the wrench or other adjusting means applied directly to the square end 268 of the shaft 259. As described in connection with Figs. 13, 14, and 15, the squared end 316 of the clamping screw 312 which adjusts the tension of the split clamp 306 may be disposed in a number of positions for easy access thereto for adjustment purposes.

Numerous changes may be made in the details of the apparatus disclosed, and certain features may be used apart from others, without departing from the principles of the invention or sacrificing the advantages thereof.

What is claimed is:

1. In combination, a wire rod straightening and feeding mechanism; a gear housing adjustably connected thereto; a motor fixedly secured to said gear housing; a mounting for said motor; and means for adjusting said motor, mechanism and housing as a unit relatively to said mounting about the armature axis of said motor.

2. An electric welding head including a welding rod straightening and driving mechanism; a gear housing adjustably connected thereto; a motor fixedly secured to said gear housing; a mounting supporting said motor; means for adjusting said motor relatively to said mounting; and means supported by said electric welding head for guiding the same relatively to the work to be welded.

3. An electric welding head including a welding rod straightening and driving mechanism; a gear housing adjustably connected thereto; a motor fixedly secured to said gear housing; a mounting for said motor; and means for adjusting said motor relatively to said mounting, said mechanism, housing and motor being adjustable as a unit about an axis parallel to the plane of the work to be welded and said mechanism being adjustable relatively to said housing in a plane including said mechanism and housing.

4. In combination, a wire rod straightening and feeding mechanism; a gear housing adjustably connected thereto; a motor fixedly secured to said gear housing; a mounting for said motor; means for adjusting said motor relatively to said mounting; a bracket adjustably connected to said mounting; and a support in which said bracket is pivotally mounted.

5. An electric welding head including a welding rod straightening and driving mechanism; a gear housing adjustably connected thereto; a motor fixedly secured to said gear housing; a mounting for said motor; means for adjusting said motor, mechanism and housing as a unit relatively to said mounting about an axis perpendicular to the axis of adjustment of said mechanism with respect to said housing; and means for conveying current to a welding rod passing through said welding head.

6. In combination, a wire rod straightening and feeding mechanism; a gear housing adjustably connected thereto; a motor fixedly secured to said gear housing; a mounting for said motor; means for adjusting said motor relatively to said mounting; a bracket adjustably connected to said mounting; a support to which said bracket is pivotally connected; adjustable rod tensioning means mounted on said gear housing; and rod guide means mounted on said support.

7. In combination, a casing having an opening in one wall thereof; wire rod straightening and feeding mechanism mounted in said casing; a gear housing adjustably connected to said casing; a motor fixedly secured to said gear housing and operatively associated with said mechanism; a mounting for said motor; means for adjusting said motor relatively to said mounting; a bracket adjustably connected to said mounting; a support to which said bracket is pivotally connected; rod tensioning means pivotally mounted on said housing adjacent the opening in the wall of said casing; rod guiding means mounted on said support; a plate adjustably mounted on said casing and closing such opening; apertured rod guiding means mounted in said plate; and means for adjusting the position of said plate on said casing to align said apertured rod guiding means with a welding rod extending into said casing.

8. An electric welding head including a welding rod straightening and driving mechanism; a gear housing adjustably connected thereto; a motor fixedly secured to said gear housing; a mounting for said motor; means for adjusting said motor relatively to said mounting; and means for conveying electric current to a welding rod passed through said welding head, said means including a bus bar secured to said mechanism, a flat jaw plate having a face fixedly engaging said bus bar and an edge engaging said welding rod, a second flat jaw plate having a face movably engaging said bus bar, and resilient means for urging an edge of said second jaw plate into engagement with said welding rod.

9. In combination, a wire rod straightening and feeding mechanism; driving rollers rotatably mounted in said mechanism and engaging a rod passed therethrough; a pressure roller adjustably mounted in said mechanism opposite each driving roller for urging the rod into engagement with the driving roller; a straightening roller adjustably mounted in said mechanism between said pressure rollers and engaging said rod; means for rotating said driving rollers; and means, adjustably mounted in said mechanism in advance of said pressure rollers, for tensioning said rod as it enters said mechanism to maintain the plane of curvature of said rod coincident with the plane of said mechanism.

10. An electric welding head including a welding rod straightening and driving mechanism; and means for conveying electric current to a welding rod passed through said welding head including a bus bar connected to said mechanism; and a pair of contact jaw plates mounted on said bus bar and each having a flat face in engagement with said bus bar, the opposite longitudinal edges of each contact jaw plate being grooved to receive a welding rod, whereby each contact jaw plate may be reversed in position on said bus bar to prolong the life of the jaw plates.

11. An electric welding head including a welding rod straightening and driving mechanism; and means connected to said mechanism for guiding the same relatively to the work to be welded; said means including a support connected to said mechanism for lateral adjustment with respect thereto, guiding means pivotally connected to said support and depending therefrom to engage the work to be welded, means for resiliently urging said guiding means into engagement with the work to be welded, and means for moving said guiding means to an inoperative position and retaining said guiding means in said inoperative position.

12. An electric welding head including a welding rod straightening and feeding mechanism; a gear housing adjustably secured thereto; a motor fixedly secured to said gear housing and operatively associated with said mechanism; a mounting for said motor; means for adjusting said motor, mechanism and housing as a unit relatively to said mounting about the armature axis of said motor; and means for depositing granular welding material on the work to be welded adjacent the end of a welding rod passed through said mechanism, said depositing means comprising a hopper secured to a wall of said mechanism and conduit means adapted to be disposed in adjacent spaced relation to such welding rod and having an opening through which such welding rod may be fed to the work, said conduit means being operatively associated with said hopper for conveying welding material therefrom to the work.

13. An electric welding head including a welding rod straightening and driving mechanism; a gear housing adjustably connected thereto; a motor fixedly secured to said gear housing; a mounting for said motor; means for adjusting said motor relatively to said mounting; means for guiding said welding head relatively to a welding groove; a bracket secured to said mounting and extending vertically therefrom; and a support in which said bracket is pivotally mounted; the pivotal connection between said bracket and support being disposed parallel to the welding groove whereby said welding head may swing as a unit in a vertical plane transversely of the welding groove to follow any irregularities therein.

14. An electric welding head including a welding rod straightening and driving mechanism; a gear housing adjustably connected thereto; a motor fixedly secured to said gear housing; a mounting for said motor; means for adjusting said motor relatively to said mounting; means for guiding said welding head relatively to a welding groove; a bracket adjustably secured to said mounting and extending in a horizontal direction therefrom; and a support in which said bracket is pivotally mounted; the pivotal axis of said bracket and said support extending in a vertical direction whereby said welding head may swing as a unit in a horizontal plane to follow irregularities in the welding groove.

15. An electric welding head including a welding rod straightening and driving mechanism; and means for guiding said welding head relatively to the work to be welded; said means including a member secured to said mechanism for lateral adjustment thereon; a supporting block secured to said member and rotatable with respect thereto in a horizontal plane; guiding fingers pivotally secured to said supporting block; means for at times maintaining said member and supporting block against relative rotation; means resiliently urging said guiding fingers into engagement with said work; and means movable longitudinally of said supporting block for lifting said guiding fingers from engagement with the work and retaining them in an inoperative position.

16. In the electric welding head claimed in claim 15, an elongated arm secured at one end to said mechanism and at the other end to said member.

17. An electric welding head including a welding rod straightening and driving mechanism; and means for guiding said welding head relatively to the work to be welded; said means including an open-ended annular block secured to said mechanism concentrically with a welding rod passed therethrough; a support slidably secured to said block for adjustment about the axis of said rod as a center; a bracket pivotally secured to said support; a guiding mechanism; and means pivotally securing said guiding mechanism to said bracket for adjustment thereon about an axis perpendicular to said rod.

18. An electric welding head as claimed in claim 17, in which said last-named means includes an elongated member secured at one end to said bracket and adjustably secured to said guiding mechanism.

19. An electric welding head including a welding rod straightening and driving mechanism; and means for guiding said welding head relatively to the work to be welded; said means including a member secured to said mechanism for lateral adjustment with respect thereto; a supporting block secured to said member and rotatable with respect thereto in a horizontal plane; arms slidably and pivotally secured to said supporting block; guide wheels mounted on said arms and engaging said work; means for at times retaining said member and supporting block against relative rotation; resilient means urging said rollers into engagement with said work; and means, movable longitudinally of said supporting block and adapted to engage said arms, for lifting said rollers from engagement with the work and retaining said rollers in an inoperative position.

20. In combination, a wire rod straightening and feeding mechanism; a gear housing adjustably connected thereto; a motor fixedly secured to said gear housing; a mounting for said motor; means for adjusting said motor relatively to said mounting; and operating means for said adjusting means located on the front, rear, and both sides of said mounting.

ALBERT WILLIAM BAIRD.
FREDERICK GURNEE OUTCALT.